US008055727B2

(12) United States Patent
Cahill et al.

(10) Patent No.: US 8,055,727 B2
(45) Date of Patent: Nov. 8, 2011

(54) USE OF A REALLY SIMPLE SYNDICATION COMMUNICATION FORMAT IN A PROCESS CONTROL SYSTEM

(75) Inventors: James S. Cahill, Austin, TX (US); Trevor D. Schleiss, Austin, TX (US); Gary K. Law, Georgetown, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 1054 days.

(21) Appl. No.: 11/233,082

(22) Filed: Sep. 22, 2005

(65) Prior Publication Data

US 2007/0067725 A1    Mar. 22, 2007

(51) Int. Cl.
*G06F 15/173* (2006.01)
*G06F 17/30* (2006.01)
*G05B 15/00* (2006.01)

(52) U.S. Cl. ............ 709/218; 709/223; 700/1; 715/733; 707/201

(58) Field of Classification Search .................. 715/733; 709/217–219
See application file for complete search history.

(56) References Cited

U.S. PATENT DOCUMENTS

| | | | |
|---|---|---|---|
| 5,400,246 | A | 3/1995 | Wilson et al. |
| 5,768,119 | A | 6/1998 | Havekost et al. |
| 5,801,942 | A | 9/1998 | Nixon et al. |
| 5,828,851 | A | 10/1998 | Nixon et al. |
| 5,838,563 | A | 11/1998 | Dove et al. |
| 6,088,707 | A | 7/2000 | Bates et al. |
| 6,198,479 | B1 | 3/2001 | Humpleman et al. |
| 6,347,398 | B1 | 2/2002 | Parthasarathy et al. |

(Continued)

FOREIGN PATENT DOCUMENTS

GB    2407176 A    4/2005

(Continued)

OTHER PUBLICATIONS

Enhancing RSS feeds: eliminating overhead through binary encoding by De Sutter, Lerouge, De Schrijver, Van de Walle presented at the Third International Conference on Information Technology and Applications, Jul. 4-7, 2005.*

(Continued)

*Primary Examiner* — Ian N Moore
*Assistant Examiner* — Thai Nguyen
(74) *Attorney, Agent, or Firm* — Marshall, Gerstein & Borun LLP

(57) ABSTRACT

A process control system within a process plant and, in particular, different devices and applications within the process control system such as field devices, controllers, user interfaces, alarm applications, diagnostics applications, etc. create, store and make data generated therein available using a really simple syndication (RSS) XML communication format, thereby making this data easily retrievable from the plant and useable for various purposes both within and outside of the plant. The RSS data communications may provide RSS data for use in control of the plant or for use in other applications not directly associated with the control of the plant, including third party applications run on devices outside of the plant, such as personal data assistants, pagers, phones, laptop computers, etc. The RSS data sent from one device to another may include enclosures, such as video, audio or text files, or may include references such as hyperlinks to other sources of information stored on the receiving device or on a further device that may be accessed and used to understand or process the RSS data.

20 Claims, 4 Drawing Sheets

U.S. PATENT DOCUMENTS

| | | | |
|---|---|---|---|
| 6,691,280 | B1 | 2/2004 | Dove et al. |
| 7,009,550 | B2 * | 3/2006 | Moeller-Jensen ............. 342/52 |
| 2002/0077711 | A1 | 6/2002 | Nixon et al. |
| 2002/0095644 | A1 | 7/2002 | Weiss |
| 2003/0014500 | A1 | 1/2003 | Schleiss et al. |
| 2003/0083754 | A1 | 5/2003 | Tripathi et al. |
| 2004/0158810 | A1 | 8/2004 | Dove et al. |
| 2006/0173985 | A1 * | 8/2006 | Moore .......................... 709/223 |
| 2006/0179463 | A1 * | 8/2006 | Chisholm et al. ............... 725/90 |
| 2006/0224250 | A1 * | 10/2006 | Callaghan ......................... 700/1 |
| 2007/0067725 | A1 * | 3/2007 | Cahill et al. .................. 715/733 |

FOREIGN PATENT DOCUMENTS

| | | | |
|---|---|---|---|
| JP | 2004102857 A | | 4/2004 |
| WO | WO 03/075206 | * | 9/2003 |
| WO | WO-03/075206 A2 | | 9/2003 |

OTHER PUBLICATIONS

AtomEnabled, "What is Atom?" (2004) Retrieved from the Internet on Dec. 28, 2006: <URL: http://www.atomenabled.org>.

Delta VM Product Data Sheet, Delta V Control Network, Workstation Specifications, Delta V Controller, Delta V Power Supplies, Delta V/I/O Subsystem, Delta V Diagnostics, Delta V Event Chronicle, Delta V Excel Add-in, Delta V Real-Time Data Server, 56 pages (1996).

Delta VM System Overview Brochure, Fisher-Rosemount Systems, 32 pages (1998).

Symantec Solutions Center, "RSS, Atom, and the Syndication Standards Dance," 1996-2006) Retrieved from the Internet on Dec. 28, 2006: <URL: http://blog.eweek.com/blogs.buzzword-compliant.archive/2004/05/05/6460.aspx>.

Technology at Harvard Law, "RSS 2.0 Specification," (2005) Retrieved from the Internet on Dec. 28, 2006: <URL: http://blogs.law.harvard.edu/tech/rss>.

Wikipedia Encyclopedia, "RSS (file format)," (2006) Retrieved from the Internet on Dec. 28, 2006: <URL: http://en.wikipedia.org/wiki/RSS_(file format)>.

Examination Report under Section 18(3) issued in GB 0618441.0 application by the United Kingdom Patent Office on May 24, 2010.

Search Report under Section 17 issued in GB 0618441.0 application by the United Kingdom Patent Office on Dec. 18, 2006.

Philippine Office Action for 1-2006-000423 mailed Jul. 29, 2010.

Examination Report under Section 18(3) issued in GB 0618441.0 application by the United Kingdom Patent Office on Oct. 7, 2010.

* cited by examiner

USE OF A REALLY SIMPLE SYNDICATION COMMUNICATION FORMAT IN A PROCESS CONTROL SYSTEM

TECHNICAL FIELD

This invention relates generally to process control systems and, more particularly, to the use of a really simple syndication communication format which includes any XML-based Web content and metadata syndication format for various communications within a process control system or a process plant.

DESCRIPTION OF THE RELATED ART

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine and then generates control signals which are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Typically, a process control system operates within a business enterprise that may include several process control plants, component and/or service suppliers and customers, all of which may be distributed throughout a large geographic area, or in some cases, throughout the world. The process control plants, suppliers and customers may communicate with each other using a variety of communication media and technologies or platforms such as, for example, the Internet, satellite links, ground-based wireless transmissions, telephone lines, etc. Of course, the Internet has become a preferred communication platform for many business enterprises because the communications infrastructure is already established, making the communication infrastructure costs for an enterprise very limited.

A process plant within an enterprise may include one or more process control systems as well as a number of other business-related or information technology systems, which are needed to support or maintain or which are used to effect the operation of the process plant. In general, the information technology systems within a process plant may include manufacturing execution systems such as, for example, a maintenance management system and may also include enterprise resource planning systems such as, for example, scheduling, accounting and procurement systems. Although these information technology systems may be physically located within or near a plant, in some cases a few or possibly all of these systems may be remotely located with respect to the plant and may communicate with the plant using the Internet or any other suitable communication link.

Each process plant may also include user-interactive applications that may be executed on a server or workstation that is communicatively coupled to one or more servers, workstations, or other computers that coordinate or perform the activities of the process control system within the plant. Such user-interactive applications may perform campaign management functions, historical data management functions, asset management functions, batch management functions, diagnostics functions, safety management functions, etc. In addition, each of the process control systems within a plant may include process management applications that may, for example, manage the communications of and provide information relating to alarm and/or other process events, provide information or data relating to the condition of the process or processes being performed by the process plant, provide information or data relating to the condition or performance of equipment associated with the process control plant, etc. In particular, process management applications may include vibration monitoring applications, real-time optimization applications, expert system applications, predictive maintenance applications, control loop monitoring applications, or any other applications related to controlling, monitoring and/or maintaining a process control system or plant.

Still further, a process plant or enterprise may include one or more communication applications that may be used to communicate information from the process control system or plant to a user via a variety of different communication media and platforms. For example, these communication applications may include e-mail applications, paging applications, voice messaging applications, RSS aggregator applications, file-based applications, etc., all of which may be adapted to send information via a wireless or hardwired media to a desktop computer, a laptop computer, a personal data assistant, a cellular phone or pager, or any other type of device or hardware platform. Moreover, process plants typically include numerous field devices, such as sensors, valves, etc. which are dispersed throughout the plant to perform various process control activities, such as changing or measuring one or more physical parameters within the process plant. Many such field devices are so-called "smart" field devices which include a processor and are able to perform various processing functions, such as diagnostic functions, alarm functions, etc. For example, HART and FOUNDATION® Fieldbus devices are typically able to implement various control and diagnostic algorithms which may be used a part of the control or maintenance functions performed with respect to the field device.

Because of the complex information technology systems now typically associated with process plants and the vast array of data associated therewith, along with the different users and manufactures of this technology, the various parts or components within or associated with a process plant generally communicate with one another using a wide variety of different communication formats and data structures, which have different standards, functionality and features. For example, intelligent field devices such as transmitters, valve positioners, analyzers, sensors, switches, etc. expose information contained therein through various process control specific industry data standards including device descriptions (DDs), Electronic Device Description Language (EDDL), Device Type Managers (DTMs), etc. Additionally, these devices communicate using a variety of communication formats such as the HART, Fieldbus, Profibus, etc. formats. Likewise, process controllers typically expose information contained therein through different various industry and proprietary standards such as Modbus IP, InternetIP, OPC, ProfiNet and others. Generally speaking, while OPC is used as a communication standard to provide or interconnect various devices or computers within a plant or associated with a process control system, even OPC itself has a number of standards such as OPC UA (universal access), OPC DA (data access), OPC HDA (historical data access) and OPC AE (alarms and events). More complex data is typically transmitted using the OPC UA, AE and DA protocols. Similarly, operator interfaces within a process plant typically use proprietary protocols, such as OPC, SQL, ProfiNet, Modbus IP, Devicenet, modbus 485, etc. to get information from controllers and other process control devices. As another example, alarm analysis software used within a process plant typically receives its information using both proprietary and open standard-based formats like OPC, SQL, ProfiNet, Modbus IP, Devicenet, modbus 485, etc.

The use of these various data and communication technologies with different and specific formats makes the data generated and sent within a process plant very difficult to read and obtain unless the requestor is very familiar with the plant structure and the particular communication formats used to generate, store and send the data being requested. Unfortunately, current plant communication and control methodology provides little or no unified support for obtaining access to or reading the various different types of data generated by different types of devices within the process plant, much less coordinating that data in some unified manner for various purposes not directly related to the day-to-day control of the plant.

SUMMARY OF THE DISCLOSURE

A process control system and architecture and, in particular, different devices and applications within a process control architecture such as field devices, controllers, user interfaces, alarm applications, diagnostics applications, OPC servers, etc. create, store and make data generated therein available in a really simple syndication (RSS) format which includes any XML-based Web content and metadata syndication format like Atom, thereby making this data easily acquirable from the plant and useable for various purposes both within and outside of the process plant. For example, the RSS data communications may be used to provide data for the control of the plant or for use in applications not directly associated with the control of the plant, including third party applications run on devices outside of the plant, such as personal data assistants, pagers, phones, laptop computers, etc. If desired, the RSS data created within field devices, controllers, etc. of the plant may be paired with rich text files, such as images like color or black and white photographs, video and audio files, voice over IP (VoIP), or may be sent with hyperlinks to such files or applications to allow the user at the receiving device to obtain additional information or support related to the RSS data generated within the plant. The rich text files or support applications may be enclosed or sent as part of the RSS data, may be stored on the receiving device and be referenced by a pointer within by the RSS data, or may be stored on a third device and be referenced by a hyperlink within the RSS data.

DETAILED DESCRIPTION

Figure 1:
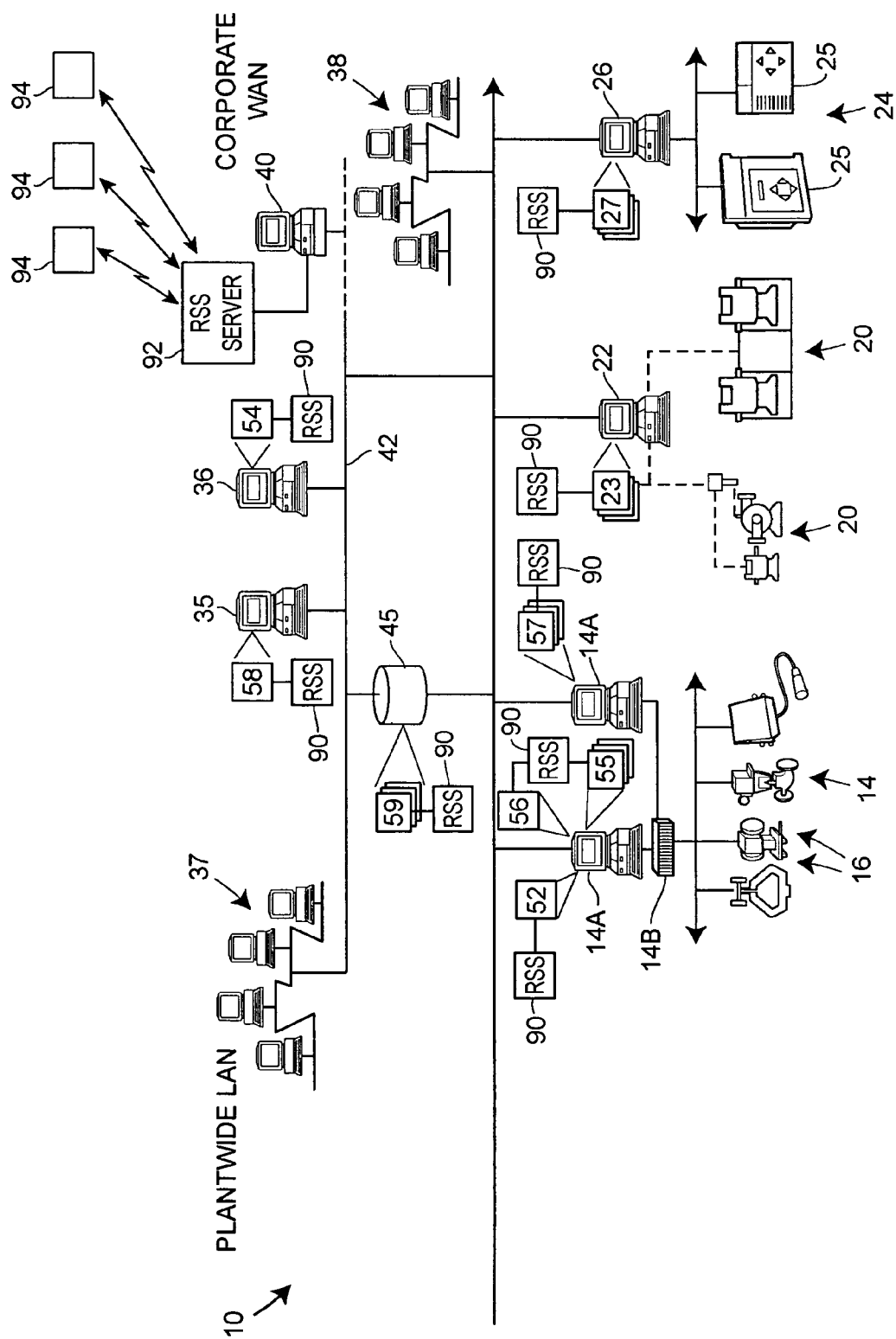
FIG. 1 is a block diagram of a process plant having a process control system, and various process equipment monitoring systems and business systems communicatively interconnected via traditional communication networks in a manner that supports RSS data creation and communication.

Referring now to FIG. 1, a process control plant 10 is illustrated as including a number of business and other computer systems interconnected with a number of control and maintenance systems by one or more communication networks. In particular, the process control plant 10 illustrated in FIG. 1 includes one or more process control systems 14 which may be, for example, distributed process control systems or any other desired type of process control systems. The process control system 14 includes one or more operator interfaces 14A coupled to one or more distributed controllers 14B via a bus, such as an Ethernet bus. The controllers 14B may be, for example, DeltaV™ controllers sold by Emerson Process Management or any other desired type of controllers. The controllers 14B are connected via I/O devices to one or more field devices 16, such as for example, HART or FOUNDATION® Fieldbus field devices or any other smart or non-smart field devices including, for example, those that use any of the PROFIBUS®, WORLDFIP®, DeviceNet™, AS-Interface and CAN protocols. As is known, the field devices 16 may provide analog or digital information to the controllers 14B related to process variables as well as to other device information. The operator interfaces 14A may store and execute tools such as alarm applications 52, diagnostic applications 55, plant operational visualization applications 56 available to the process control operator for controlling the operation of the process including, for example, control optimizers, diagnostic experts, neural networks, tuners, etc.

Still further, maintenance systems, such as computers executing the AMS Suite™ (Asset Management Solutions) software sold by Emerson Process Management or any other device or equipment monitoring and communication applications may be connected to the process control system 14 or to the individual devices therein to perform maintenance and monitoring activities. For example, maintenance applications 57 such as the AMS Suite application may be installed in and executed by one or more of the user interfaces 14A associated with the distributed process control system 14 to perform maintenance and monitoring functions, including data collection related to the operating status of the devices 16. Of course, these maintenance applications 57 may be implemented in other computers or interfaces within the process plant 10.

The process control plant 10 also includes various rotating equipment 20, such as turbines, motors, etc. which are connected to a maintenance computer 22 via a permanent or temporary communication link (such as a bus, a wireless communication system or hand held devices which are connected to the equipment 20 to take readings and are then removed). The maintenance computer 22 may store and execute known monitoring and diagnostic applications 23 or any other known applications used to diagnose, monitor and optimize the operating state of the rotating equipment 20. Maintenance personnel usually use the applications 23 to maintain and oversee the performance of rotating equipment 20 in the plant 10, to determine problems with the rotating equipment 20 and to determine when and if the rotating equipment 20 must be repaired or replaced. In some cases, outside consultants or service organizations may temporarily acquire or measure data pertaining to the equipment 20 and use this data to perform analyses for the equipment 20 to detect problems, poor performance or other issues effecting the equipment 20. In these cases, the computers running the analyses may be disconnected from the rest of the system 10 or may, instead, be connected only temporarily.

Similarly, a power generation and distribution system 24 having power generating and distribution equipment 25 associated with the plant 10 is connected via, for example, a bus, to another computer 26 which runs and oversees the operation of the power generating and distribution equipment 25 within the plant 10. The computer 26 may execute known power control and diagnostics applications 27 such as those provided by, for example, Liebert and ASCO or other service companies to control and maintain the power generation and distribution equipment 25. Again, in many cases, outside consultants or service organizations may temporarily acquire or measure data pertaining to the equipment 25 and use this data to perform analyses for the equipment 25 to detect problems, poor performance or other issues effecting the equipment 25. In these cases, the computers (such as the computer 26) running the analyses may be connected to the rest of the system 10 via a communication line or may be connected only temporarily, if desired.

As illustrated in FIG. 1, the plant 10 may also include business system computers and maintenance planning computers 35 and 36, which may execute, for example, enterprise resource planning (ERP) applications 54, material resource planning (MRP) applications 58, process modeling for performance modeling, accounting, production and customer ordering systems, maintenance planning systems or any other desired business applications such as parts, supplies and raw material ordering applications, production scheduling applications, etc. A plantwide LAN 37, a corporate WAN 38 and a computer system 40 that enables remote monitoring of or communication with the plant 10 from remote locations may be connected to the business systems 35 and 36 via a communications bus 42.

Additionally, a computer system 45, which may be a server or a host, may be communicatively connected to the process control and/or maintenance interfaces 14A of the distributed process control system 14, the rotating equipment maintenance computer 22, the power generation and distribution computer 26, and the business systems all via the bus or other communication link 42. The computer system 45 may use any desired or appropriate local area network (LAN) or wide area network (WAN) protocol to provide communications. If desired, the computer system 45 may be a data historian and run any data historian access applications 59, may be a configuration database and store configuration data or may store other types of data and run other types of applications 59. Of course the computer system 45 could be connected to these different parts of the plant 10 via other communication links including fixed or intermittent links, hard-wired or wireless links and/or links that use any physical medium such as one of wired, wireless, coaxial cable, telephone modem, fiber optic, optical, meteor burst, satellite medium using one of, for example, a Fieldbus, IEEE 802.3, blue tooth, X.25 or X.400 communication protocol, etc.

Of course, any other equipment and process control devices could be attached to or be part of the plant 10 and the system described herein is not limited to the equipment specifically illustrated in FIG. 1 but can, instead or in addition, include any other types of process control equipment or devices, business systems, data collection systems, etc.

In the past, the various process control systems 14 and the business systems 35, 36, etc., have not been interconnected with each other or with business systems in a manner that enables them to easily share data generated in or collected by each of these systems in a useful manner or to provide this data to external applications, such as applications run on or available through the host computer 40, the plantwide LAN 37, the corporate WAN 38, etc. Likewise, process control systems disposed within a plant did not store or communicate data in a simple and standard format that was easy to interpret and access even within the business systems or other computers associated with that plant. As a result, data that was generated within the plant 10 was typically used for specific purposes and was limited with respect to the computer systems that had access to that data. For example, data developed in field devices was generally created in and communicated within a specialized and sometimes proprietary format and was generally limited in distribution to controllers and user interfaces that had applications designed to use that data for particular control and maintenance purposes. This data was not generally or easily available to business systems, user interfaces on the corporate WAN 38, etc. Still further, if users at these other computers or associated with these other systems wanted to access data from the field devices or controllers, they would have had to know and understand the protocol in which that data was generated and stored within those devices and use one or more of a multiplicity of different types of communications to obtain that data. This non-uniformity in the creation and storage of data at different points or locations within the plant, based on the different devices creating the data, made the data hard to access and even harder to use for any purpose other than the purposes which were considered when the plant was set up or configured.

To overcome this problem, data that is created in or stored by various devices or by various applications or modules within the various devices of a process plant is stored and/or sent using the RSS data format, which makes this data easily available and usable within the plant and outside of the plant for a wide variety of purposes other than the uses for which the data was initially created. Generally speaking, as used herein, an RSS data or communication format includes any Web content syndication format and, in particular, defines a dialect of XML. As a result, all RSS files must conform to the XML 1.0 specification as published on the World Wide Web Consortium (W3C) website. RSS formats are generally known in the art of public communication networks and at least some are described more particularly at http://blogs.law.harvard.edu/tech/rss. However, it is intended that the use of RSS herein additionally covers, includes or refers to the broad spectrum of syndication formats including RSS 1.0, RSS 2.0, Atom (which are described in more detail at http://blog.ziffdavis.com/gallagher/archive/2004/06/05/1208.aspx), any of the syndication formats described at http://en.wikipedia.org/wiki/RSS_(file_format) and any other Web content syndication formats whether traditionally referred to an RSS format or not.

The RSS data stored in the RSS format is easily ascertainable and readable by any authorized user as the RSS format is commonly used in Internet and other types of wide area network systems, and is commonly known and understood in the field. Furthermore, the RSS format is very robust, allowing multiple different types of functions for the data. Of course, the RSS data is easily available, subscribeable (which means that one can ask for and receive a subscription to the data source to be notified of changes, new data, etc.) and readable within the process plant by any application that supports the RSS format. This feature makes the process plant data that is available in an RSS format easily used in many value-added or third party applications which were not contemplated at the time that the application or device that initially created or stored the data was set up or configured within the process plant. For example, various applications to be executed on or as part of hand-held devices, mobile phones and PDAs (personal data assistants), in GPS systems, on portable laptop computers, etc. may be developed to display or otherwise use the process or plant data created and stored in the RSS format. These applications may use the RSS data to provide various desirable features or functions helpful to process control engineers, plant maintenance persons, business persons, etc. which before were not developed because of the lack of availability of the process or plant data or because of the difficulty in obtaining the data from the process plant.

Referring again to FIG. 1, an RSS data conversion block 90 is placed in any desired location or in any desired device within the process plant 10 and may interface with applications or hardware that already exist within these devices to convert data created or stored by these applications into RSS data. Such blocks 90 are illustrated in FIG. 1 as interfacing with the alarm, viewing and diagnostic applications 52, 55 and 56, the maintenance applications 57, the support applications 23 and 27 as well as with the business and management applications 54 and 58.

Generally speaking, each RSS conversion block takes the data or copies of the data created by or stored by the various applications or modules to which they are attached and converts the data into the RSS format. The blocks 90 may then store this data locally for access and/or subscription via any authorized user, or may stream this data to one or more other devices such as host devices, user devices, etc. In the example of FIG. 1, the RSS blocks 90 may, for example, stream created RSS data to the host device 40 for storage in a server memory 92 and further dissemination to, for example, the other devices within the plant 10 or to devices 94 communicatively connected to the host 40 via, for example, the Internet (not shown), a wireless connection, such as a telephone or wireless data connection, etc.

Figure 2:
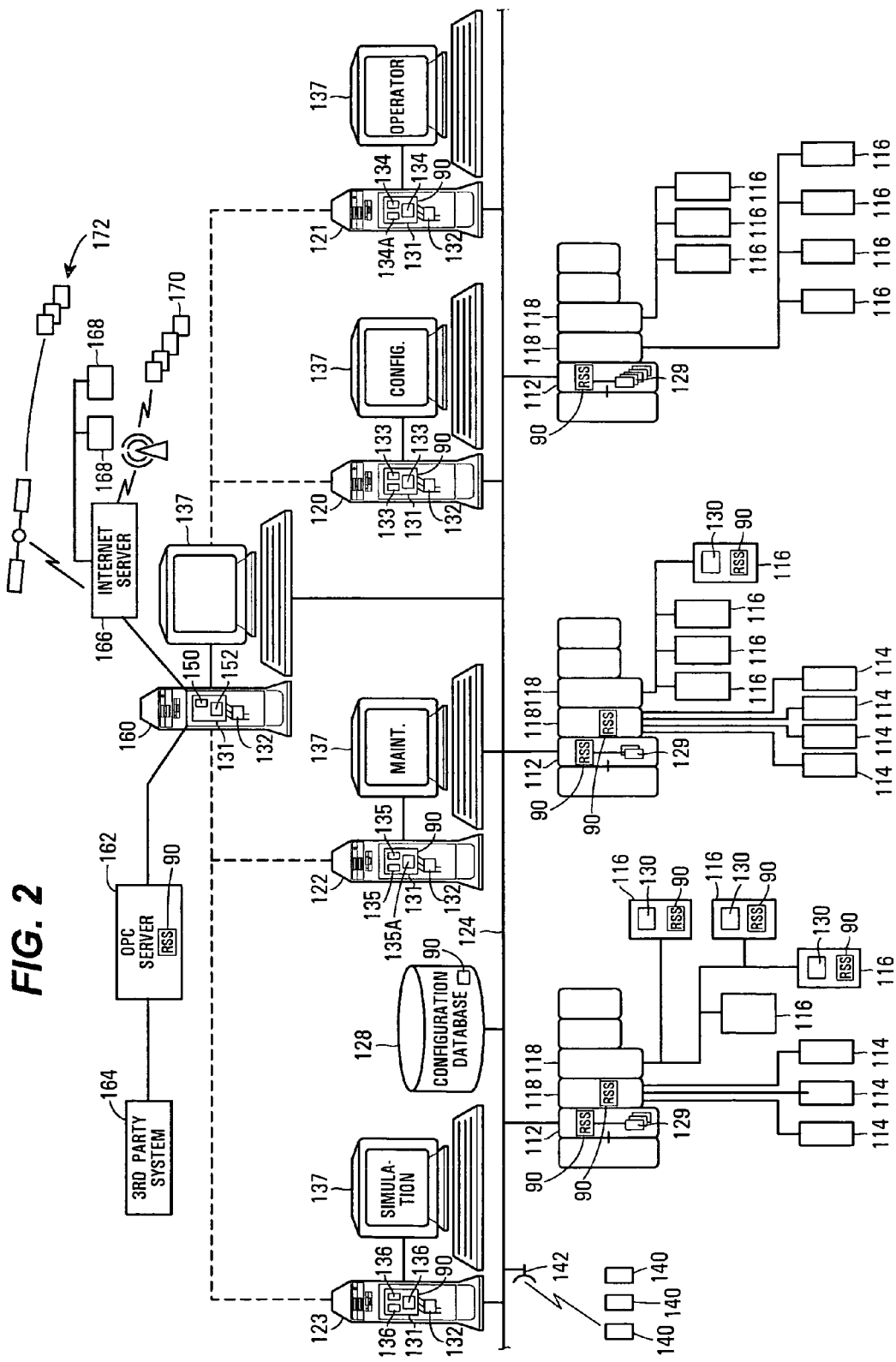
FIG. 2 is a detailed block diagram of a distributed control system associated with a process plant that includes RSS data creation and communications.

Of course, the RSS blocks 90 can be provided in any devices within the process control plant 10 to convert or provide any desired type of data in the RSS format, including within controllers, input/output devices, field devices, etc. As an example, FIG. 2 illustrates in more detail a process control system of a process plant 110 in which RSS data may be created, stored and sent by various control related devices and applications. As is typical, the process plant 110 includes a distributed process control system having one or more controllers 112, each connected to one or more field devices 114 and 116 via input/output (I/O) devices or cards 118 which may be, for example, Fieldbus interfaces, Profibus interfaces, HART interfaces, standard 4-20 ma interfaces, etc. The controllers 112 are also coupled to one or more host or operator workstations 120-123 via a data highway 124 which may be, for example, an Ethernet link. A database 128 may be connected to the data highway 124 and operates as a data historian and/or a configuration database to collect and store parameter, status and other data associated with the controllers 112 and the field devices 114 and 116 within the plant 110 and/or to store the current configuration of the process control system within the plant 110 as downloaded to and stored within the controllers 112 and field devices 114 and 116.

While the controllers 112, I/O cards 118 and field devices 114 and 116 are typically located down within and distributed throughout the sometimes harsh plant environment, the operator workstations 120-123 and the database 128 are usually located in control rooms or other less harsh environments easily assessable by controller or maintenance personnel unless ruggedized and rated for the harsh environment. Still further, as illustrated in FIG. 2, handheld or other mobile or wireless devices 140 may be communicatively connected to the plant 110 via, for example, a transmitter 142 connected to the communication network 124 or via any other wireless link, including a satellite link, a wireless telephone link, a wireless Internet link, etc.

As is known, each of the controllers 112, which may be by way of example, the DeltaV™ controller sold by Emerson Process Management, stores and executes a controller application that implements a control strategy using any number of different, independently executed, control modules or blocks 129. Each of the control modules 129 can be made up of what are commonly referred to as function blocks wherein each function block is a part or a subroutine of an overall control routine and operates in conjunction with other function blocks to implement process control loops within the process plant 110. As is well known, function blocks, which may be objects in an object oriented programming protocol, typically perform one of an input function, such as that associated with a transmitter, a sensor or other process parameter measurement device, a control function, such as that associated with a control routine that performs PID, fuzzy logic, etc. control, or an output function that controls the operation of some device, such as a valve, to perform some physical function within the process plant 110. Of course hybrid and other types of complex function blocks exist such as model predictive controllers (MPCs), optimizers, etc. While the Fieldbus protocol and the DeltaV system protocol use control modules and function blocks designed and implemented in an object oriented programming protocol, the control modules could be designed using any desired control programming scheme including, for example, sequential function block, ladder logic, etc. and are not limited to being designed and implemented using the function block or any other particular programming technique.

In the plant 110 illustrated in FIG. 2, the field devices 114 and 116 connected to the controllers 112 may be standard 4-20 ma devices, or may be smart field devices, such as HART, Profibus, or FOUNDATION™ Fieldbus field devices, which include a processor and a memory, or may be any other desired type of devices. Some of these devices, such as Fieldbus field devices (labeled with reference number 116 in FIG. 2), may store and execute modules, or sub-modules, such as function blocks, associated with the control strategy implemented in the controllers 112. Function blocks 130, which are illustrated in FIG. 2 as being disposed in two different ones of the Fieldbus field devices 116, may be executed in conjunction with the execution of the control modules 129 within the controllers 112 to implement process control, as is well known. Of course, the field devices 114 and 116 may be any types of devices, such as sensors, valves, transmitters, positioners, etc. and the I/O devices 118 may be any types of I/O devices conforming to any desired communication or controller protocol such as HART, Fieldbus, Profibus, etc.

In the process plant 110 of FIG. 2, the workstations 120-123 may include various applications that are used for various different functions performed by the same or different personnel within the plant 110. Each of the workstations 120-123 includes a memory 131 that stores various applications, programs, data structures, etc. and a processor 132 which may be used to execute any of the applications stored in the memory 131. In the example illustrated in FIG. 2, the workstation 120 is designated as a configuration workstation and includes one or more configuration applications 133 which may include, for example, control module creation applications, operator interface applications and other data structures which can be accessed by any authorized configuration engineer to create and download control routines or modules, such as the control modules 129 and 130, to the various controllers 112 and devices 116 of the plant 110.

The workstation 121 is generally illustrated in FIG. 2 as a control operator viewing workstation and includes a number of display applications 134 which may provide a control operator with various displays during operation of the process plant 110 to enable the operator to view and control what is happening within the process plant 110 or in various sections of the plant 110. The applications 134 may include support applications 134a such as control diagnostic applications, tuning applications, report generation applications, alarm and event applications, or any other control support applications that may be used to assist a control operator in performing control functions.

Similarly, the workstation 122 is illustrated as a maintenance viewing workstation and includes a number of maintenance applications 135 that may be used by various maintenance personnel to view the maintenance needs of the plant 110, to view the operating or working condition of various devices 112, 114, 116, 118, etc. Of course, the applications 135 may include support applications 135a such as maintenance diagnostic applications, calibration applications, vibration analysis applications, report generation applications or any other maintenance support applications that may be used to assist maintenance persons in performing maintenance functions within the plant 110.

Additionally, the workstation 123 is indicated as a simulation workstation which includes a number of simulation applications 136 that may be used to simulate operation of the plant 110 or various sections of the plant 110 for any number of purposes, including for training purposes, for plant modeling purposes to assist in plant maintenance and control, etc. As is typical, each of the workstations 120-123 includes a display screen 137 along with other standard peripheral devices, like a keyboard, a mouse, etc.

While the various configuration, control, maintenance and simulation applications 133-136 are illustrated in FIG. 2 as being located in different workstations dedicated to one of those functions, it will be understood that the various applications 133-136 associated with these or other plant functions may be located in and executed in the same or different workstations or computers within the plant 110, depending on the needs and set up of the plant 110. Thus, for example, one or more simulation applications 136 and control applications 133 may be executed in the same workstation 120-123, while different individual simulation applications 136 or different individual control applications 133 may be executed in different ones of the workstations 120-123.

Again, as with the business system applications for the process plant, the development of the different applications used in the different functional areas of the plant 110 has typically been performed fairly independently. Thus, the development of the configuration applications 133 is not generally integrated with the simulation applications 136, the maintenance applications 135 or the operator control applications 134. In fact, in many instances, a plant may include applications for the different functional areas that were developed by different companies or software suppliers, and which were in fact developed to run independently of the other software within the plant 110. As a result of this independent development and operation of the different applications associated with the various functional areas of the plant 110, data is typically stored and sent in the particular protocols most used by or selected for the particular functional area. Thus, control data and maintenance data is typically set up and stored in different formats to be used by different types of applications developed to support the control and the maintenance functions. Thus, with respect to FIG. 2, each of the various applications 133-136 that perform configuration, control, maintenance and simulation functions generally include or use different graphic display editors and database structures to assist the plant personnel in performing these configuration, operator control, maintenance and simulation functions. In many instances, these different data structures require a very specific or even a proprietary data structure making it hard to access and read that data for any purpose other than that for which the data was created.

Because the applications 133-136 and even the modules within the controllers 112 and the field devices 114 and 116 for each of the various functions within the plant 110 were generally developed and implemented independently of one another, sometimes by different people and even different companies, the data used in the different functional areas of the process plant 110 has not been stored in any integrated, consistent or easily understood manner.

To alleviate these inefficiencies and to provide for more widely usable and understandable data integration within the plant 110, the various applications, devices, and modules within the plant 110 may create, aggregate or store data in the RSS data format to make data widely available, subscribeable and usable within the plant. In the example of FIG. 2, a host station 160 may act as a host for RSS data generated within the process plant 110 to make that data available to other applications which may subscribe to the RSS data.

More particularly, as illustrated in FIG. 2, an RSS block 90 may be coupled to or included with each of the various applications, modules, function blocks, etc. disposed in the various devices including within the controllers 112, the I/O devices 118, the field devices 116 and 114 (if possible), as well as in the configuration database 128 and any of the user interfaces 120-123. As with the RSS blocks of FIG. 1, the RSS blocks 90 illustrated in FIG. 2 receive data from the associated devices, applications, modules, etc. and convert this data to the RSS data format and either store that data or send the converted data to other devices, and in some cases to the RSS host device 160 which may store this data in a local host memory 152 (which may include any type of memory such as RAM, ROM, flash, disk-based, etc. memory devices) and may attach or provide further data, text, media, applications, etc. stored in a memory 150 for use in analyzing, viewing or using the RSS data.

In some instances, such as with field device, I/O devices and controllers, the RSS blocks 90 may allow subscriptions to particular types or categories of data and, when a user or a device has subscribed to the data, the RSS blocks 90 may automatically send the RSS data to that subscriber on a periodic, an exception (e.g., based on changes), or a continuation basis. On the other hand or in addition, the RSS blocks 90 may send data to or make data available for being read by the RSS host device 160 for storage in an RSS accessible database 152 and for dissemination to other devices or users if so desired. For example, the RSS blocks in the field devices 116 or the I/O devices 118 may send the converted RSS data to an associated controller 112 which may act as a host for that data and which may then send that data to other devices according to a subscription schedule or based on requests by other users or other devices. Likewise, if desired, the configuration database 128 or any of the user interfaces 120-123 may act as RSS data host devices for, for example, the controllers 112. In another example, the centralized host device 160 illustrated in FIG. 2 may operate as a host device for any of the RSS data generated in, for example, any of the user interface devices 120-123, the configuration database 128, the controllers 112 or any of the applications, modules or programs running in any of these devices. In the example of FIG. 2, the RSS host device 160 is illustrated as being a dissemination point for RSS data to various devices outside of the process control system or the process plant. In particular, an OPC server 162 connects the device 160 to third party systems 164 using the well known OPC communication format. Likewise, an Internet server or other communication server 166 connects the host device 160 to various devices, such as computers 168 connected to the Internet or other public hardwired communication network, and to wireless devices 170 and 172 communicatively coupled to the server 166 via, for example, ground based wireless systems (170) or satellite based wireless systems (172).

As illustrated in FIG. 2, the RSS data may be sent from one device to another device or be made available for being read by one device from another device via any established or present communications network using any desired or needed communications protocol associated with the communications network. Thus, the RSS data may be sent from the controllers 112 to the user interfaces 120-123 via an established communications network like the bus 124, while RSS data may be sent from the field devices 114 and 116 to the I/O devices 118 and the controllers 112 via the Fieldbus, HART or other communications lines present within the plant. In this case, the RSS data may be digitally superimposed on and communication line, or may be encoded into the HART, Fieldbus, etc. signals and decoded as RSS data at the receiving device. In another example, the RSS data may be sent from the user interface devices 120-123 to the RSS host device 160 via the bus 124 using an Ethernet protocol or using a web-based protocol.

However, if desired, a separate communication network or link may be established between various devices to transmit the RSS data. For example, as illustrated by the dotted lines in FIG. 2, the RSS host device 160 may communicate with the user interfaces 120-123 via a separate link, such as an Internet link, a separate LAN or WAN connection, a wireless link, an OPC link, etc. to access the RSS data within these devices. While not shown in FIG. 2, separate links may be established between other devices as well for the transmittal of RSS data. Thus, the RSS host device 160, or any of the user interfaces 120-123 may be connected to any of the controllers 112, the I/O devices 118, or the field devices 114 and 116 via any desired wireless or wired communications link to transmit the RSS data therebetween.

Still further, an RSS block 90 may be located in one device and process or convert data from another device into the RSS format. In this manner, the data to be converted into the RSS format does not need to be converted in all cases within the device in which that data is originally created or stored. For example, an I/O device 118 or a controller 112 may include an RSS block 90 that receives and decodes data from another device, such as from a field device 114 or 116 received in, for example, the HART, 4-20 ma or Fieldbus format and that then converts this data to RSS data for further dissemination. This feature is particularly useful in limiting the number of places at which an RSS block 90 needs to be placed within an embedded process plant and, additionally, allows data from traditional or conventional devices that will not support an RSS block, such as HART or 4-20 ma devices, to be converted into RSS data.

Figure 3:
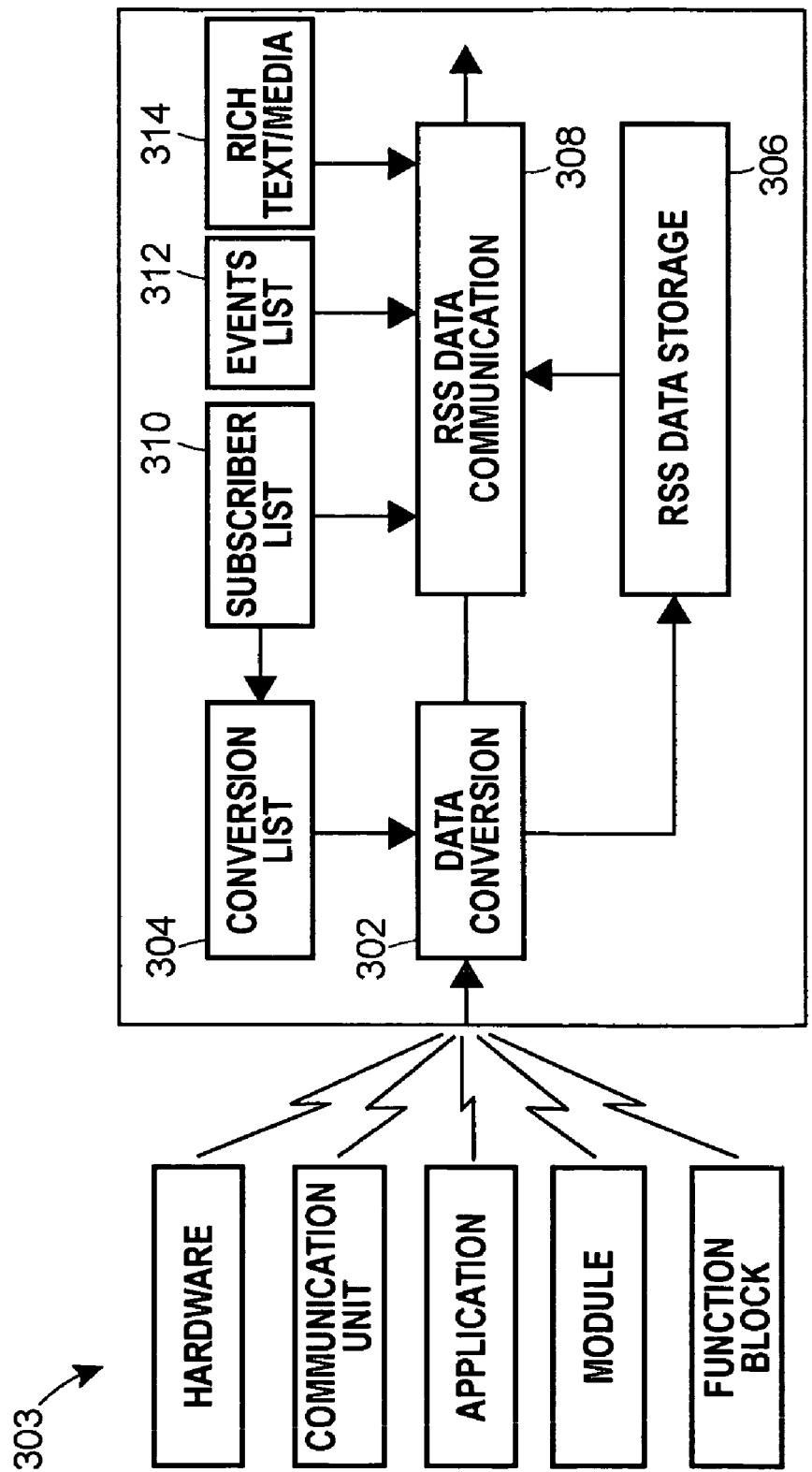
FIG. 3 is a block diagram illustrating an RSS block that may be used to perform RSS data conversion, storage and communications within one or more devices associated with a process control system.

FIG. 3 illustrates one possible configuration for the RSS blocks 90. The RSS block 90 of FIG. 3 may perform RSS conversion of data from within the same device in which the block 90 is located and/or may perform conversion of data from another device. Furthermore, the RSS block 90 can perform any or all of the functions of storing the RSS data in a local memory, making the RSS data available upon request, creating and sending an RSS data stream to one or more subscribers or to a host device, and sending rich media or references such as hyperlinks to rich media or other applications for the RSS data as part of an RSS data communication.

As will be seen, the RSS block 90 of FIG. 3 includes a data conversion module 302 which communicates with one or more data providers 303. The data providers 303 are illustrated in FIG. 3 as being one or more of hardware or firmware within the device in which the RSS block 90 is located, a module, a function block or an application running within the device in which the RSS block 90 is located or a communication unit that receives the data to be converted from another device via any desired communication interface. Such communication units may be those associated with any data communications format including, for example, HART, Fieldbus, Profibus, Modbus, OPC, etc.

In any event, the data conversion module 302 interprets the incoming data and determines if the data is the type or kind of data to be converted to the RSS format. In some cases, it may not be necessary to convert all of the received data to the RSS format. Here, the module 302 may use a conversion list stored in a memory 304 that provides an indication of the type and kinds of data that should be converted to the RSS format. The list in the memory 304 may be set up when the RSS block 90 is configured within a device, and may be added to and changed based on subscriptions to particular data that may be established when the RSS block 90 is running.

If the incoming data is data that is to be converted, the data conversion module 302 converts that data to the RSS format using any desired or standard conversion technique that produces data in the RSS format, which is an XML-based format. Upon conversion, the data conversion module 302 may store the RSS data in a local memory store 306 and additionally or alternatively may provide the RSS data to an RSS communications unit 308 which sends the RSS data to other devices, applications, modules, etc. within or outside of the process control system. The RSS communications unit 308 may be configured to send all of the RSS data that it receives to one or more RSS host devices immediately upon receipt of that data, may be configured to periodically send RSS data based on a communications schedule, may be configured to send RSS data in response to a request for that data by a further device, or may be configured to send RSS data when a trigging event occurs.

In this regard, the RSS block 90 may include a subscriber list 310, an events list 312 and a rich text memory 314 all of which may be connected to and used by the RSS communication unit 308 to perform communications of RSS data. In particular, when sending RSS data using a subscriber-based schedule, the RSS communication unit 308 may use the subscriber list 310 to determine what data to send to which particular subscribers. The subscribers may be other users, applications, or machines within the process plant, or devices outside of the process plant but connected thereto via an appropriate communications network. In any event, the subscriber list 310, which may be updated to add, change and delete subscriber information during operation of the plant, defines one or more subscribers of RSS data, the particular data that is being requested by the subscriber and, if desired, the frequency that the data should be sent. If desired, this subscriber data may be provided to and used to update the data conversion list stored in the memory 304.

In another example, if the RSS data is being sent based on the occurrence of an event or based on some parameter within the process plant, the RSS communication unit 308 may use the events list 312 which defines the RSS data to be sent and the event which triggers the sending of this data. Such events may include, for example, the receipt or generation of an alarm or event of a particular kind or severity, a significant change in process plant data or variables of some kind, etc. In any case, the RSS communication unit 308 may send RSS data in a steaming format, such as upon receipt of that data from the data conversion unit 302, or may periodically send blocks of similar RSS data at a predefined frequency or refresh rate. In the latter case, the RSS data may be stored in the memory store 302 until it has been sent to all of the subscribers or recipients of that data.

Of course, in some cases, the RSS communication unit 308 may send all the RSS data to a host device which stores and further disseminates that data according to a subscriber list or according to some other method. If desired, the RSS data may be stored in the local storage until new data replaces that data (such as data for sensor measurements, etc.) and a user may subscribe to all or some of the data within the memory and may then periodically receive downloads of the data. If desired, host devices, which typically have more memory space, may store historical RSS data.

Alternatively or additionally, if desired, the RSS communication unit 308 may process single requests from users for data and provide the requested RSS data as stored in the memory store 306 to the requester based on that request. This feature, of course, is similar to a server providing a web page to a requestor of that page and allowing the requestor to update the page with new information when the requestor desires. Of course, the data requestor of any of the RSS data described herein can be a user, a device, or an application of some kind.

The rich text unit 314 may include rich text, such as media files, or references, such as hyperlinks, to be embedded in and sent along with particular RSS data, i.e., as enclosures with the RSS data. In this case the unit 314 may store hyperlinks or the rich text, which may be image files (e.g., color or black and white photographs), audio files, video files, video streams, VoIP streams, text files with or without graphics, etc., which files may be in any desired format. One significant feature of the RSS communication protocol is that, when sending RSS data, such as diagnostic data, control data, etc., the RSS communication unit 308 may additionally send appropriate rich text in the form of enclosures or files (such as text, video, audio, etc. files) and/or in the form of references (such as hyperlinks) to other sources of data or applications that may be used or accessed to better understand or manipulate the RSS data.

The rich text stored in the memory 314 may, in some case, include simple data that can be used by other applications to perform certain desirable functions. For example, the rich text memory 314 may include global positioning system (GPS) coordinates associated with the device, or map coordinates associated with the device that created the data that may be used by a mapping program, such as Mapquest or Google, to create a map for locating or reaching the device. These coordinates may then be used by other applications, such as by an application within a handheld or a mobile device to determine the location of the device that generated the RSS data, to give directions to the device, etc. Of course, other types of data may be stored in the rich text unit 314 and provided for other purposes.

Generally speaking, the RSS data format provides an improved approach to format and display of the configuration, diagnostic, and run-time information within intelligent field devices, I/O devices, controllers, applications such as alarm and event applications, etc. and makes this data available to subscribers of the information including host systems, software applications, mobile communication devices, etc. The RSS format extends across the information technology space to provide greater levels of interoperability, language localization, and innovation than existing automation standards can provide.

As indicated above, the RSS data may be stored in a local memory, such as a memory on the device in which the RSS data is generated, or may be streamed or sent via any convenient communication connection to another device, such as a host device, a user interface, a centralized database, etc. In some cases, such as with older devices like HART and 4-20 ma field devices, the RSS unit 90 that generates the RSS data may be stored or implemented in a gateway device, such as in a controller or an I/O device which communicates with the field device.

Because it is supported by the RSS format, the RSS data may include "enclosures" or rich media where the XML file of the intelligent field devices, controllers, I/O devices, user interfaces or host devices, etc. can include or can point to other multimedia files contained on host systems. This additional media may be rich text (e.g., text with graphics), pictures or photos, audio files, VoIP, video files or other types of multimedia files or information. These multimedia files can, for example, offer diagnostic expertise and repair information, contact via VOIP to remote experts, or other types of information in the form of audio and video files, may provide training and troubleshooting tips, and other non-text information to improve the ongoing performance and maintenance of the intelligent field devices, the controllers, and surrounding manufacturing process. If desired, the RSS data could also include, if desired, hyperlinks or other references to a host system or to another device or server, such as one connected to the Internet, which provides more information or data or applications to be run with respect to the RSS data. This feature makes more information available to the user without having to store and send that information from the process control device in which the RSS data is generated. Additionally, this feature provides a better environment for language localization.

Figure 4:
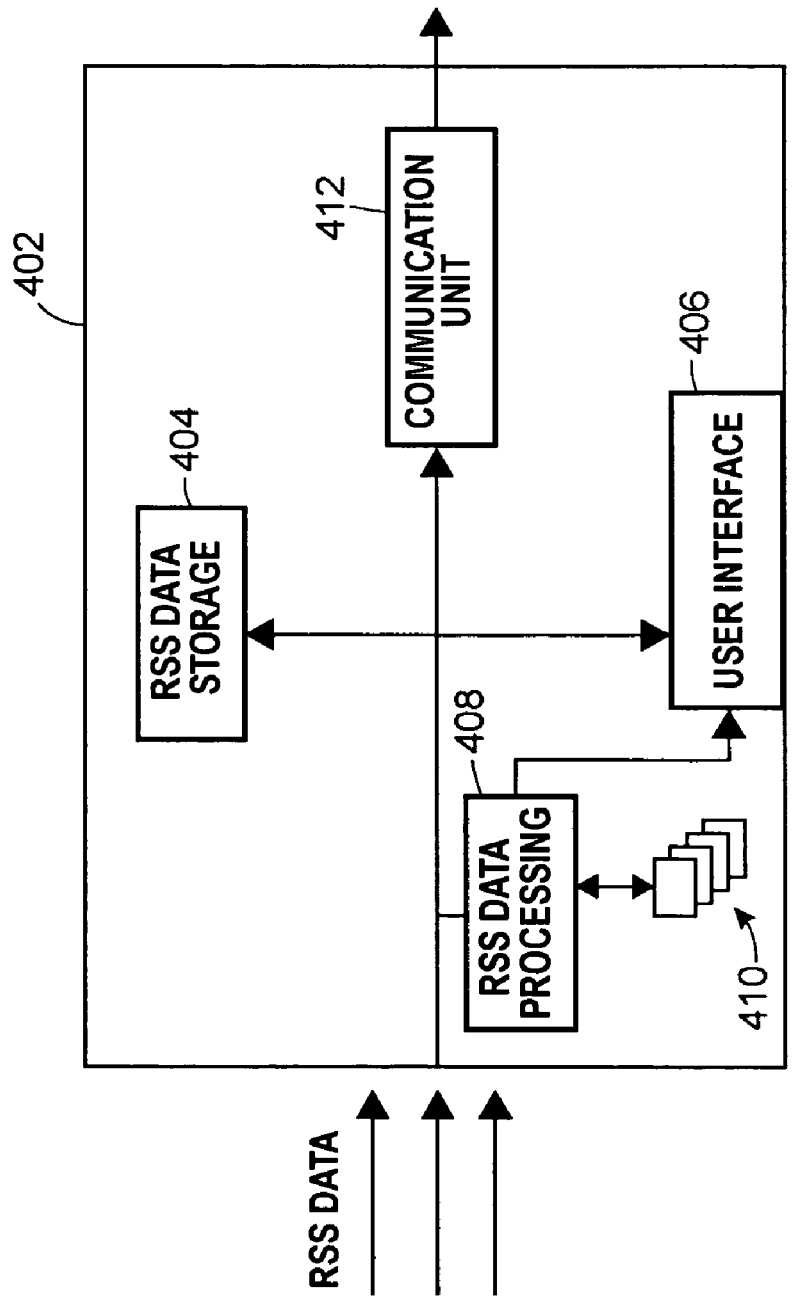
FIG. 4 is a block diagram of an RSS block within a host device that receives RSS data and that provides additional information with the RSS data for use by a user.

FIG. 4 illustrates a block diagram of one example host device 402 that may acquire, store and use RSS data according to the principles described above. In particular, the host device 402 receives RSS data from one or more RSS data sources, which may be other devices such as controllers, user interface devices, field device, I/O devices, etc. or which may be other modules, function blocks or applications (such as control maintenance, diagnostic, alarm and event, business, etc. applications) within the process plant. The host device 404 may store the RSS data in an RSS data storage unit 404. If desired, the host device 404 may store any amount of historical RSS data or may update the memory 404 to store only the latest RSS data for any particular type or kind of data. The host device 402 may also include a user interface application 406 which drives a user interface of any desired construction, such as a computer screen, a PDA screen, an audio device, etc. Typically, the user interface 406 enables a user to view and run applications on the RSS data, including the RSS data stored in the memory 404.

An RSS data processing unit 408 may be used to process or monitor the incoming RSS data and look for links or references to local files 410 which may be applications or rich media files such as video clips, picture, audio clips, etc. stored within the host device 402. Upon detecting such a reference, the processing unit 408 may alert the user interface 406 that such a program or file exists and allow the user interface 406 to execute the application or to implement the rich text file in conjunction with displaying or using the RSS data. Likewise, the processing unit 408 may look for links to other information or applications available outside of the host device (such as through the Internet) as specified within the incoming RSS data and provide those links to the user interface. If desired, the host device 404 may automatically request the additional information as specified within an RSS data link via a communication unit 412 which provides communications with other devices. Of course, the communication unit 412 may also provide other devices access to the RSS data stored in the RSS data store 404 in any manner described above.

The host device 402 could be any desired type of device, including for example, a server, a user interface, a mobile device (such as a PDA, a phone, etc.), a controller, etc. As a result, in some cases, the host device 402 need not include the user interface 406, but may simply act as a storage device and/or a server for RSS data to be sent to and used at other host devices.

There are of course many examples of the manner in which the rich text and hyperlinks in the RSS data could be advantageously used within a process environment. For example, rich media in the form of audio or video files could reside on mobile devices (smart phones, PDAs, personal video players, etc.) which receive the RSS data. If these devices subscribe to or receive the appropriate RSS feed or data, the RSS data will point to or include a pointer to the correct audio or video file (e.g., one of the files 410 of FIG. 4) to play to interpret the data, which could be, for example, diagnostic data, alarm data, process run-time data, etc. The RSS data could also point to or refer to an interactive application on the host or other device that enables the user to interact with the data to perform some function with respect to the process plant, such as a diagnostic function in which the referenced application shows the user how to fix a detected problem. As another example, an intelligent field device could provide global positioning system (GPS) coordinates or Google map locations in its RSS XML data structure and could send this information along with the RSS data to be used by an application on the receiving device (such as a host 402) to help quickly identify the location of the field device to assist, for example, maintenance personnel. If desired, the RSS data could include a hyperlink to a GPS application or a mapping application, either stored on the receiving or host device or available via a communication network connected to the receiving or host device.

In the example in which RSS data comes from a controller, the multimedia files (which could be sent to the receiving device or which could be stored locally on the receiving device) could include audio files which offer diagnostic expertise and repair, video files which provide controller training and troubleshooting tips, and other non-text information to improve the ongoing performance and maintenance of the controllers and the surrounding manufacturing process. Here again, rich media referred to by the controller RSS data, like audio or video files, can reside on mobile devices (smart phones, PDAs, personal video players, etc.) When these devices subscribe to an RSS feed of a controller, the RSS data from the controller may include a link or a reference pointing to the correct audio or video file to play to interpret the controller data or may include a hyperlink to an appropriate application or reference site that can be used in interpreting the controller RSS data. Like a field device, a controller could provide GPS coordinates or Google (or other mapping program or website) map locations in its XML structure to help quickly identify its location for maintenance personnel. If desired, the controller RSS data may be event based, and thus the controller may send RSS messages that pertain to and include control performance data, device diagnostics and health, production data, video data, safety data and many others based on the occurrence of an event, such as the end of a batch run, a particular alarm or limit being reached, etc. In one particularly useful example, a controller may use RSS data in performing communications in wide area networks, such as those typically found in distributed oil and gas applications.

Another example of where RSS data may be appropriately used in a process plant relates to OPC servers. In the automation market today, OPC is used as a communication standard to enable dissimilar systems, such as those manufactured by different providers or for different purposes, to communicate data therebetween. Such an OPC server 162 is illustrated in FIG. 2 as being connected to the host device 160 and to a third party system 164. However, in addition or instead, the OPC server 162 can pass along the RSS data from the control systems to the third party applications to provide an improved approach that sends very specific messages to subscribers of the information including host systems, software applications, mobile communication devices, etc. in a manner that makes the data usable without a lot of processing and conversion. Here again, the XML file of the OPC server can point to multimedia files contained on third party systems other than where the data source is located. On the third party systems, multimedia files can include audio files which offer diagnostic expertise and repair, video files which provide training and troubleshooting tips, and other non-text information to improve the ongoing performance maintenance of the system transmitting the data and the surrounding manufacturing process. Of course, existing OPC methodologies can be used in addition to the RSS data. Thus, an OPC server such as the server 162 of FIG. 2 can still use existing protocols, with a simple translation to the XML format being performed on demand. Additionally, like controller data, the OPC server RSS data may be event based, so that the OPC server sends messages that pertain to and include control performance data, device diagnostics and health data, production data, video data, safety data and many others types of data based on the occurrence of a one or more events within the process plant. Thus, as will be understood, the RSS feed may be used to connect dissimilar control systems through a low speed intermittent communications line.

In another case, user interfaces may advantageously send and receive RSS data. User interfaces, such as operator interfaces typically use proprietary, OPC, SQL, ProfiNet, Modbus IP, Devicenet, modbus 485, etc. communications to get information from controllers and other process control devices. In this case, the use of an RSS data stream provides an improved approach to receive very specific messages from RSS feed sources such as RSS servers (OPC foundation or otherwise), RSS enabled control systems, RSS enabled field devices or other RSS enabled asset management or maintenance systems. The operator interfaces, which can be host devices, can source the multimedia files pointed by the RSS enabled field device, controller, or OPC server and, as stated above, these multimedia files can include audio files which offer diagnostic expertise and repair, video files which provide training and troubleshooting tips, and other non-text information to improve the ongoing performance and maintenance of the system transmitting the data and the surrounding manufacturing process. Likewise, the user interfaces may be connected via, for example, the Internet, to other sources of data and applications and the RSS feed may include hyperlinks or references to such sources, so that the user interfaces need not store all of the rich media used to support the RSS data being received. Instead, the user interfaces may access the data or applications (which may be provided for example on a device manufacturer's website) using the hyperlinks within the RSS data.

Thus, as will be understood, any operator interface (which could include mobile devices like smart phones, PDAs, personal video players, etc.) can use or obtain rich media (such as audio or video files) referred to within the received RSS data. In some cases, the operator interfaces may play the selected multimedia file based upon the enclosure pointed to in the RSS feed, and may play the correct audio or video file or execute the correct diagnostic or viewing application to interpret the diagnostic, control, and/or historical performance data within the RSS feed. If desired, the operator interface may use OPML outliner technology to discover the available RSS feeds within the plant and present the information in outline format to enable a user to select one or more RSS data feeds to which the user would like to subscribe.

Still further, applications executed on, for example, user interfaces and workstations, such as the workstations 120-123 of FIG. 2, and for example, alarm applications, may receive RSS data or information from both proprietary, and open standards-based OPC, SQL, profiNet, Modbus IF, Devicenet, modbus 485, etc. communications to thereby receive and process information from controllers and other process control devices. These applications, which may include user viewing applications, may obtain the rich text and other media (such as audio and video files) that are within or that are referred to by the sending device within the RSS data to for example, provide diagnostic expertise and repair, to provide training and troubleshooting tips, to improve the ongoing management of conditions causing alarms and events to occur, etc. Likewise, the analyses generated by the applications, for example, alarm analysis data generated by alarm analysis software, can be made available to other applications using an RSS data stream. In one example, applications like alarm applications may send output data in the RSS format to RSS enabled operator interfaces and mobile devices for viewing, display and manipulation. In this case, the alarm analysis software can source the enclosed multimedia and other data pointed to by RSS enabled field devices, controllers, OPC servers, etc. or can pass along a reference to such multimedia if the multimedia is stored within or can be obtained by the receiving device.

Of course, the rich media, like audio or video files, can reside on mobile devices (smart phones, PDAs, personal video players) running the alarm analysis software or other software. In this case, the alarm analysis software will play the selected multimedia file based upon an enclosure within the RSS data pointing to the appropriate multimedia files for that data. In this manner, the receiving device may automatically run the correct audio or video file or select the correct application to run to interpret the diagnostic, control, and/or historical data.

The information referenced on the host or other accessible device could provide or be related to providing more specific interactive help if desired, product information, help sources, etc. This information could be in the form of rich text or media files, such as video clips, sound files, images, etc. associated with the data being provided which might be used to better understand or interpret the data being provided from a device in the RSS format. Of course, existing methodologies can be used as the source of the information. That is a field device can still use an EDDL file internally, with a simple translation to the XML format being performed on demand. Likewise, the controllers providing the RSS data can still use proprietary or standard protocols, such as the Modbus IP, InternetIP, OPC, ProfiNet, DeltaV, and others, with a simple translation to the RSS XML format being performed on demand. Additionally, OPC servers could still use the OPC standards, while user interfaces and other applications could send and receive data and messages in traditional formats using traditional process control based communications formats.

While the process control systems described herein with respect to FIGS. 1 and 2 have been described as including RSS blocks 90 that convert data generated by devices, applications, modules, etc. in another format into the RSS format and that then provide the RSS data to further devices such as host devices 402, it will be understood that the devices, applications, modules, etc. within the process plant could be constructed or manufactured to create and send data in the RSS format in the first place, instead of using the traditional process control communication standards. In this case, communications between field devices and controllers or I/O devices, communications between controllers and user interfaces or host systems, etc. could all or mostly take place using the RSS data communication standard or format. If desired, the RSS data format could be applied and used for the transmission of all non-runtime control data, i.e., all data not involved in actually controlling the process during runtime, or could be applied to all data, including runtime control data. In the latter case, the process plant can be constructed to use the RSS communication format as the primary communication format at all levels within the plant, thereby making all of the data easily available and usable by all other users, applications, devices, etc.

While the RSS based communications system and process control applications described herein have been described as being implemented using a traditional RSS-XML based server, this combined system can be implemented using any other suitable Web content syndication format, such as the ATOM format described more particularly at http://www.atomenabled.org. Further, although the functions of the RSS blocks described herein are described as being implemented primarily as software, some or all of these functions may be implemented in hardware, firmware, etc. Thus, the RSS based communication system and technique described herein may be implemented in a standard multi-purpose processor or using specifically designed hardware or firmware as desired. When implemented in software, the software routines discussed herein may be stored in any computer readable memory such as on a magnetic disk, a laser disk, or other storage medium, in a RAM or ROM or flash memory of a computer or processor, etc. Likewise, the software may be delivered to a user or a process control system via any known or desired delivery method including, for example, on a computer readable disk or other transportable computer storage mechanism or over a communication channel such as a telephone line, the Internet, etc. (which are viewed as being the same as or interchangeable with providing such software via a transportable storage medium).

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A process plant, comprising:

(1) a computing device including an operator interface;

(2) a multiplicity of process control devices, each configured to communicate with other process control devices using a protocol that is not a web content syndication format, and the multiplicity of process control devices includes at least one of:
   (a) a process controller that is:
      1) communicatively coupled to the computing device,
      2) configured to store and execute a control module configured to receive a sensor signal from a first field device and generate at least one corresponding control signal to at least one of the first or a second field device for controlling equipment in the process plant based on the sensor signal, the control module including at least one function block used in implementing a process control loop in the process plant, and
      3) directly connected to each of the first field device and the second field device via a corresponding input/output device or card;
   (b) at least one of the first, the second, or a third field device configured to perform a physical action in the process plant to affect a process variable or to sense the process variable; or
   (c) the corresponding input/output device or card;
(3) a plurality of web content syndication data conversion units, each of the web content syndication data conversion units coupled to a different process control device of the multiplicity of process control devices and configured to convert process control data generated by the different process control device into the web content syndication format; and
(4) one or more communication networks that connect the multiplicity of process control devices and the computing device,
(5) and wherein the each of the multiplicity of process control devices communicates the process control data to a corresponding different web content syndication data conversion unit, and the corresponding different web content syndication data conversion unit converts the process control data generated by the each of the multiplicity of process control devices into the web syndication format and communicates the converted process control data over the one or more communication networks directly to another one of the multiplicity of process control devices, wherein the multiplicity of process control devices includes the process controller.

2. The process plant of claim 1, wherein the multiplicity of process control devices further includes the first, the second, or another field device.

3. The process plant of claim 1, wherein the another one of the multiplicity of process control devices is at least one field device communicatively coupled to the process controller.

4. The process plant of claim 1, wherein the another one of the multiplicity of process control devices is a user interface device communicatively coupled to one or more process controllers.

5. The process plant of claim 1, wherein the multiplicity of process control devices includes an OLE for Process Control (OPC) communication device.

6. The process plant of claim 1, wherein the web content syndication format is the really simple syndication (RSS) communication format and the each web content syndication data conversion unit is a RSS data conversion unit.

7. The process plant of claim 6, wherein the RSS data conversion unit includes a memory for storing RSS data.

8. The process plant of claim 6, wherein the RSS data conversion unit includes a subscriber list for RSS data and a communication unit that communicates the RSS data to subscribers based on the subscriber list.

9. The process plant of claim 6, wherein the RSS data conversion unit includes an event list associated with RSS data and a communication unit that communicates the RSS data to another device based on the occurrence of an event within the events list.

10. The process plant of claim 6, wherein the RSS data conversion unit includes a media memory storage that stores rich media files for use within RSS data.

11. The process plant of claim 10, wherein the media memory storage stores one or more of a video file, an audio file and a color or black and white image file.

12. The process plant of claim 10, wherein the media memory storage stores one or more applications that may be executed to process the RSS data.

13. The process plant of claim 10, wherein the media memory storage stores specific data associated with a particular process control device or an application that created the RSS data.

14. The process plant of claim 13, wherein the specific data includes one of global positioning system data and mapping data.

15. The process plant of claim 10, wherein the media memory storage stores a reference to a source of a media file or an application for use with the RSS data.

16. The process plant of claim 6, wherein the another one of the multiplicity of process control devices is a host device that receives RSS data from one of the multiplicity of process control devices, wherein the host device includes an RSS data storage unit for storing RSS data and a user interface for interfacing with a user with respect to the received RSS data.

17. The process plant of claim 16, wherein the host device further includes a storage unit that stores one or more data files or applications associated with the received RSS data and that may be used in conjunction with the user interface to interface with a user with respect to the received RSS data.

18. The process plant of claim 17, wherein the one or more data files or applications includes one of an audio file, a video file, a voice over IP data stream, and an image file.

19. The process plant of claim 17, wherein the one of the multiplicity of process control devices is adapted to send a reference to one of the one or more of the data files or applications stored within the host device as part of the received RSS data.

20. The process control device of claim 1, wherein:
   the process controller is a first process controller and the corresponding input/output device or card is a first input/output device or card, and
   the other process control devices in the process plant include at least one of: a second process controller; at least one of the first, the second or a third field device; or at least one of the first input/output device or card or a second input/output device or card.

* * * * *